May 15, 1951 R. G. MINER 2,553,060
HEATING CONTROL SYSTEM
Filed April 6, 1946 3 Sheets-Sheet 1
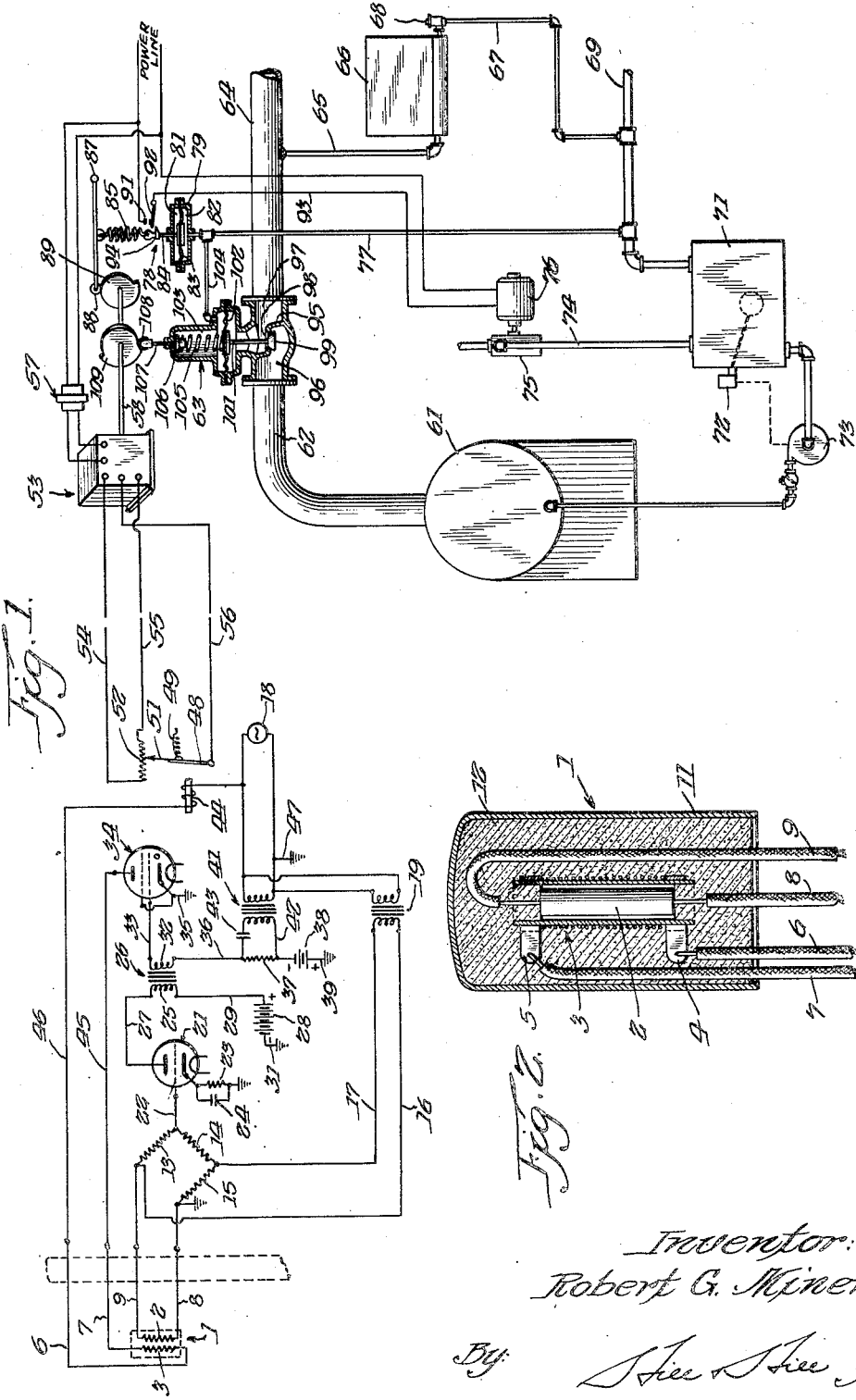
Inventor:
Robert G. Miner

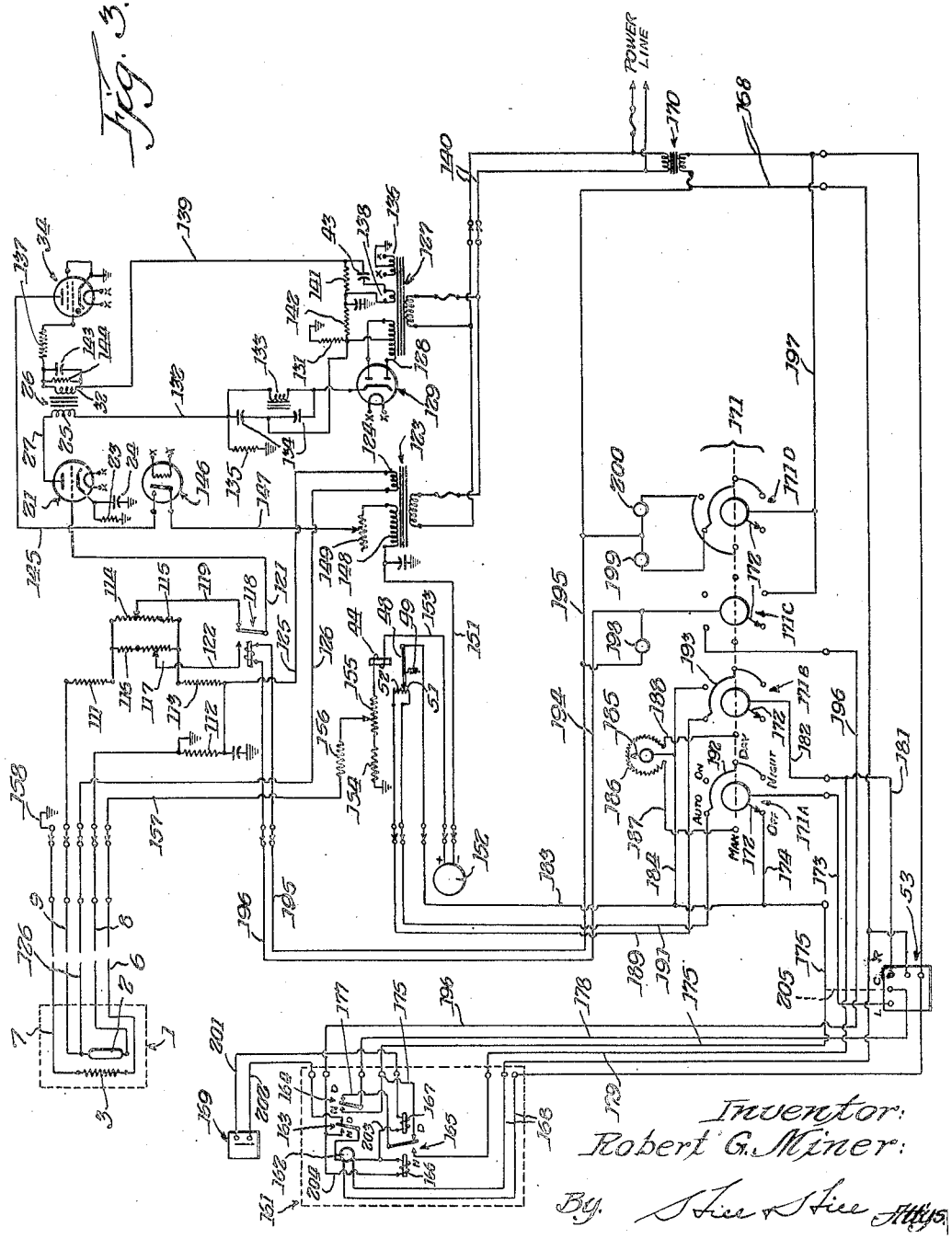

May 15, 1951        R. G. MINER        2,553,060

HEATING CONTROL SYSTEM

Filed April 6, 1946        3 Sheets-Sheet 3

Inventor:
Robert G. Miner
By Lee & Lee Attys.

Patented May 15, 1951

2,553,060

UNITED STATES PATENT OFFICE 2,553,060

HEATING CONTROL SYSTEM

Robert G. Miner, La Crosse, Wis., assignor to The Trane Company, La Crosse, Wis., a corporation of Wisconsin Application April 6, 1946, Serial No. 660,097

10 Claims. (Cl. 236—46)

The invention relates generally to heat exchange systems for enclosures or the like and more particularly to a novel means for controlling such systems.

The invention has as one of its objects the utilization of a novel method of controlling a heat exchange system for producing temperature changes within an enclosure subject to external temperature conditions, wherein a control unit is subjected to substantially the same external temperature conditions as the enclosure and the action of the system within the enclosure is simulated within the control unit substantially in proportion to the relative heat exchange characteristics of the enclosure and unit with respect to the existing conditions to which both are subjected, the operation of the system being continuously varied, as distinguished from intermittently operated, in response to temperature changes within the control unit resulting from the action of the external conditions thereon.

A further object of the invention is the production of an electronic control device which will provide continuously variable control action throughout its operating range, as distinguished from an intermittent control action, such device having high sensitivity over its operating range.

Another object of the invention is the production of such a control device which may be easily installed for use with existing heat exchange systems and readily adapted to different types of systems, as well as readily adjusted to various types of enclosures providing either uniform or intermittent day and night control of the system.

Another object of the invention is the production of a novel temperature responsive control device for controlling the operation of an electrical circuit, which device requires no movable elements, switch contacts and the like.

Another object of the invention is the production of novel means for varying the operation of a sub-atmospheric heating system, whereby the system may be operated under varied preselected conditions throughout its operating range.

Many other objects and advantages of the construction herein shown and described will be obvious to those skilled in the art from the disclosure herein given.

To this end my invention consists in the novel construction, arrangement and combination of parts and method herein shown and described and more particularly pointed out in the claims.

In the drawings where like reference characters indicate like or corresponding parts:

Fig. 1 is a schematic diagram of a steam heating system and electronic control therefor;

Fig. 2 is a sectional view of the external control unit embodying the variable control elements utilized in the control device;

Fig. 3 illustrates one form of a complete electrical control circuit embodying the present invention;

Figure 4:
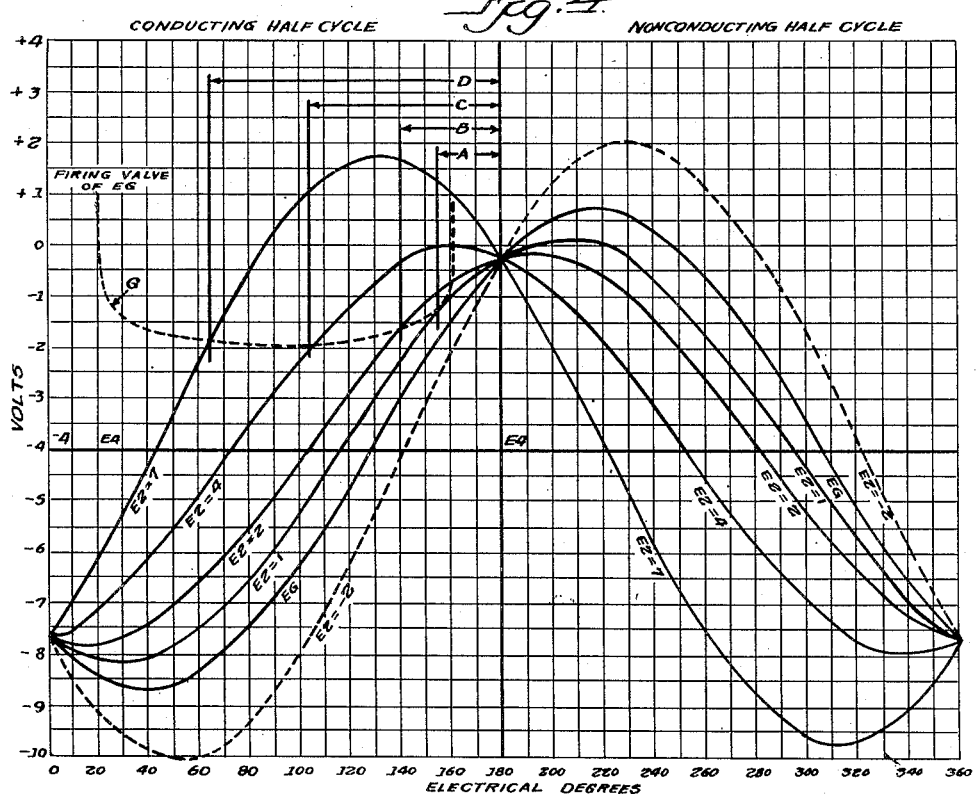
Fig. 4 is a graph illustrating the phase shift in the electrical control circuit.

For illustrative purposes, the present invention is disclosed in combination with a steam heating system of the sub-atmospheric type, although it will be apparent from the disclosure herein made that the electronic control device and the control mechanism may be readily adapted for use on other types of heating systems, as well as other forms of heat exchange or other controllable systems.

It has been customary in the past to control heating systems and the like by means of thermostats or temperature responsive switches either placed in the enclosure to be heated, at the exterior of the enclosure, or a combination of both, whereby the system is intermittently operated, the output of the system usually depending upon the duration of the heat demand within the enclosure. A system of this general type is disclosed in United States Letters Patent No. 2,076,518 issued April 6, 1937 to P. E. Seepe, in which the system is intermittently operated by an outside thermal switch, a set amount of heat being applied to the switch when the system is in operation. In such a system the total amount of heat transmitted to the outside switch and the enclosure is dependent upon the duration of each cycle of operation of the system.

The present invention contemplates the use of an external unit which houses a variable heat responsive element, continuously variable over the desired operating range. Heat is applied to this element substantially in proportion to the output of the heating system, the ratio of the amount of heat applied to the unit, to the amount of heat being applied to the enclosure, being proportional to the relative heat exchange characteristics of the enclosure and unit with respect to the exterior conditions of the enclosure, thus tending to simulate within the control unit the corresponding temperature conditions within the enclosure. Consequently the heat lost from the control unit, as a result of the external conditions to which it is subjected, will be proportional to the heat lost from the enclosure. As variations in the variable element within the control unit will thus be proportional to the heating requirements of the enclosure, such variations may be employed to control the operation of the heating system. Thus the heating system and the control mechanism may be continuously operated in a manner comparable to the throttle on a gas engine or the like, whereby the output of the system will be just sufficient to meet the heat demand. Obviously, as the system is in continuous operation, and constantly under the variable control of the temperature responsive element, a much more uniform temperature may be maintained in the enclosure than with an intermittently operated system.

The control device illustrated herein contemplates the use of a variable temperature responsive electrical resistance element which may be positioned within the control unit, variations in the resistance of this element being used to vary a control potential which in turn varies the operation of an electronic valve. Output current from the electronic valve is passed through a magnetic control actuating mechanism operative to vary the operation of the heating system and all or part of such current is passed through a suitable heating resistance in heat transfer relation with the variable resistance.

The electrical circuit embodying the variable temperature responsive resistance element is so designed that a drop in the temperature of such element, below a predetermined value, will actuate the electronic device, which in turn will cause the heating resistance to transmit heat to the variable element, thus tending to bring the temperature of the same back to its original value and as both the heating resistance and the variable resistance are subjected to external temperature conditions, heat will be lost from the control unit. As a result thereof the temperature of the variable element normally will not return to its original predetermined value, the difference between the predetermined value and the value to which it will rise as a result of the application of heat thereon will be proportional to the amount of heat lost from the unit, and the amount of current flowing through the circuit as a result of this differential will be proportional to the amount of heat required from the heating system to compensate for heat lost from the enclosure due to the external conditions to which the latter is subjected. By the use of an electronic control it is possible to achieve such results with a very small drop in temperature of the resistance element, which drop may be only one degree or even as small as several tenths of a degree to obtain full operation of the heating system. Consequently, the temperature of the outside unit is maintained at almost the same temperature as the enclosure interior whereby high sensitivity and efficiency are obtained.

*The basic electronic control circuit*

Referring to Fig. 1 which, for purposes of explanation, discloses a simplified electronic control circuit in conjunction with a sub-atmospheric heating plant, 1 designates generally an external control unit adapted to be positioned at the exterior of the enclosure and subject to substantially the same weather conditions as the enclosure. The unit 1, as shown in detail in Fig. 2 comprises a commercially procurable resistance element 2 having a high temperature coefficient, the resistance of the element varying approximately four percent per degree centigrade. Surrounding the resistance element 2 is a heating resistance designated generally by the numeral 3 which in the present instance is illustrated as a wire wound type of resistance having connecting terminals 4 and 5 to which are secured leads 6 and 7 respectively. The resistance element 2 is likewise provided with connecting leads 8 and 9. The two resistance elements are housed in a container 11 of suitable material filled with a suitable insulating compound 12, the materials employed for the container 11 and compound 12 being preferably such that the heat loss from the resistance elements to the exterior approximates the relative heat loss through the structure of the enclosure, the control unit being mounted at the exterior of the enclosure by any suitable means.

Referring again to Fig. 1, the resistance element or resistor 2 is connected in closed series with a plurality of resistors 13, 14 and 15 to form a bridge network across which at the juncture of the resistors 2 and 13 and the juncture of the resistors 14 and 15, by wires 16 and 17 respectively, is applied an alternating potential derived from a suitable power source 18 and reduced down to the desired working voltage by means of the transformer 19. The bridge network is grounded at the juncture of the resistances 2 and 15, and connected at the juncture of the resistances 13 and 14 to the control grid of a suitable vacuum tube 21 by means of the conductor 22. It will be apparent that, due to the variable resistance characteristics of the resistor 2, alternating potentials of varying values will be applied to the grid of the tube 21, depending upon the values of the respective resistors forming the network and the temperature of the variable resistor 2. The cathode of the tube 21 may be connected to ground through a suitable resistor 23 bridged by the usual by-pass condenser 24 to provide self-bias on the tube 21, whereby the tube may be operated at sufficient bias to provide desirable operating characteristics, depending upon the type of tube employed.

The plate of the tube 21 is connected to the primary 25 of a coupling transformer, designated generally by the numeral 26, by means of the conductor 27, the opposite end of the primary 25 being connected to the positive side of a suitable source of direct current, as for example, the battery 28, by a conductor 29, the negative side of the battery being grounded as shown at 31. One end of the secondary 32 of the coupling transformer 26 is connected by the conductor 33 to the control grid of a thyratron or gas filled electronic tube designated generally by the numeral 34, the cathode of which is grounded as indicated at 35. If the tube 34 contains a suppressor grid, as illustrated, it preferably also could be grounded as shown. The opposite end of the secondary 32 is connected by means of the conductor 36 and resistor 37 to the negative side of a low direct potential source, illustrated in the present instance as a battery 38, the positive side of which is grounded as shown at 39 to provide a small negative bias on the control grid. Operatively connected to the alternating potential source 18 is a transformer 41, one end of the secondary winding thereof being connected through the conductor 42 to the resistor 37 at its connection with the battery 38, the opposite end of the secondary winding being connected to the other end of the resistor 37 through a suitable condenser 43.

It will be apparent that as a result of the resistance-capacity network, formed by the resistor 37 and condenser 43 across the secondary of the transformer 41, an alternating potential will appear across the resistor 37, the phase of which will be displaced with respect to that of the alternating potential source 18.

The plate of the tube 34 is connected to one side of the alternating potential source 18 in series with a solenoid winding 44 and the resistance 3 by means of the conductors 45 and 46. The opposite side of the potential source 18 is grounded as shown at 47 to complete the electrical circuit across the tube 34.

*Operation of the basic electronic circuit*

The resistance values of the resistors 2, 13, 14 and 15 forming the components of the bridge network are so chosen that when the resistor 2 is at a predetermined temperature, the bridge will be balanced and no alternating potential will be applied to the grid of the vacuum tube 21. For the purposes of illustration, it will be assumed that the bridge will be in a balanced condition when the temperature of the resistor 2 is at 65 degrees Fahrenheit. The components of the grid biasing network formed by the secondary of the transformer 41, condenser 43, resistance 37 and battery 38 are such as to render the tube 34 non-conducting in the absence of an alternating potential appearing in the plate circuit of the tube 21, and the alternating potential applied across the bridge network from the transformer 19 is of a value to render the tube 34 conductive for at least a part of the positive half cycle appearing in its plate circuit.

This operation will be more thoroughly understood from a reference to Fig. 4 in which the broken curve G represents the value of the control grid potential on the tube 34 required to render the latter conductive, this curve being plotted from the operating characteristics given by the manufacturer for the particular type of tube employed, in the present instance a #2050. In plotting the alternating potential on this graph the direct potential applied to the grid of the tube 34 by the battery 38 has been taken as a negative 4 volts. It will be apparent that the insertion of this negative bias on the grid of the tube 34 lowers the alternating potential curves with respect to the firing curve G of the tube. The value of the alternating potential developed across the resistor 37 is such that when plotted on the graph it will fall slightly below the firing curve G, whereby the tube 34 will remain non-conductive. This alternating potential applied to the grid in the absence of a control potential applied thereon from the bridge network is designated as EG on the graph, and it will be noted that the failure of this curve to intersect the firing curve G results not only from the negative 4 volts bias but also from the fact that such alternating potential is displaced in phase with respect to the alternating potential applied to the plate of the tube. At this point in the operation of the circuit, no plate current flows through the thyratron circuit and, therefore, none through the resistor 3. As the outside temperature to which the unit 1 is subjected drops, thereby lowering the temperature of the resistor 2, the resistance of the latter will likewise change and, assuming that this resistor has a negative temperature coefficient, the resistance will increase, thereby throwing the bridge out of balance. The unbalance of the bridge network will in turn result in the appearance of an alternating potential in the grid circuit of the vacuum tube 21 and, after amplification of such potential by this tube, will be impressed upon the control grid of the thyratron tube 34. This impressed potential will be in phase with the alternating potential applied to the plate of the tube 34 and will cause a shift in phase of the combined potentials on the grid of the tube 34. Such shift is illustrated by the remaining solid curves on the graph, these curves representing different values of the potential applied to the grid as a result of different values of the resistance 2; for example, when the impressed control potential equals one volt the combined voltage on the grid will follow the curve $e2=1$ of the graph. When the voltage equals two, four or seven volts the potential will follow the curves $e2=2$; $e2=4$, and $e2=7$ respectively on the graph. It will be noted that when such potential is approximately one volt the curve will intersect the firing curve G, thus rendering the tube 34 conductive, and as this tube is a thyratron or gas filled tube, it will remain conductive for the remainder of that half cycle, the duration of conductivity during such half cycle being indicated by the line A on the graph. Similarly when the control potential aproximates two volts, the duration will be increased as indicated by the line B, four volts as indicated by the line C and seven volts as indicated by the line D. As the duration of conductivity over the positive half cycle increases, the tube, of course, conducting at full current during the conducting periods, the mean or average current in the plate circuit will gradually increase from a very small amount up to a relatively large amount. In the event that the temperature of the resistor 2 rises above the predetermined balance value, a potential will also be applied to the grid of the tube 34 but as this voltage component will then be in opposite phase to the normal control voltage appearing across the bridge network, the curve of the combined potential designated $e2=-2$ on the graph, does not intersect the firing curve G, thus having no tendency to render the tube 34 conductive.

As the resistor 3 is in series with the plate of the tube 34, the plate current thereof will flow through such resistor. The construction and value of the resistor 3 is such that upon passage of plate current therethrough heat will be developed, and as the resistor 3 is in heat transfer relationship with the resistor 2 it will tend to increase the temperature thereof with a corresponding reduction in potential appearing in the grid circuit of the tube 21. With the reduction in control potential applied to the tube 21, the average plate current of the tube 34 will be correspondingly reduced which in turn will reduce the heat transmitted from the resistor 3 to the resistor 2. This action will continue until the circuit reaches equilibrium, and obviously when this condition is reached, the current passing through the resistor 3 is just sufficient to compensate for the heat lost from the unit to the exterior. Should the external temperature subsequently rise, less heat will be lost from the unit, consequently the temperature of the resitor 2 will rise, thereby reducing the control potential applied to the tube 34 with a consequent reduction in plate current until the device is again in equilibrium.

Similarly in the event the temperature drops further, the reverse action would take place.

In actual practice the temperature drop in the resistor 2, required to actuate the tube 34 at full operating current may be only one degree or less below the predetermined temperature at which the bridge is in a balanced condition.

Operatively related to the solenoid winding 44 is an armature 48 biased by a spring 49 tending to draw the armature away from the solenoid winding 44, the armature being movable towards or away from the latter in response to the variation in the current flowing therethrough. Thus the armature 48 will in effect move in response to variations in the temperature of the resistor 2. Carried by the armature 48 is a wiper arm 51 which contacts a resistor 52, the potentiometer formed by the contact 51 and resistor 52 being operatively connected to the control terminals of a modulating motor illustrated generally by the numeral 53, the resistance being connected thereto by conductors 54 and 55 and the wiper and the wiper arm 51 by the conductor 56. Power is applied to the motor from a suitable source, as for example, the transformer 57. The motor 53 is of a conventional type commercially procurable and has been used in the heating trade as a damper actuator or the like. The rotatable drive shaft of this motor may be controlled by a potentiometer, such as that illustrated, whereby the drive shaft will follow the position of the contacting arm as hereinafter explained in greater detail. In the present instance, when the contact arm 51 moves across the resistance 52 the drive shaft 58 of the motor 53 will rotate through a number of degrees, the shaft moving clockwise and contra-clockwise in response to the movement of the contact arm 51.

*Construction and operation of the heating system illustrated*

The embodiment of the invention illustrated in Fig. 1 discloses the control circuit in combination with a subatmospheric type of steam heating system comprising a suitable source of steam, such as the boiler 61 connected by a supply conduit 62 to a pressure reduction valve, indicated generally by the numeral 63. Suitable radiators are operatively connected from the discharge side of the reduction valve 63 through a supply main 64 and piping 65, only one radiator 66 being illustrated. A return pipe 67 is connected to the radiator 66 through a return trap 68, the latter being of the usual type in use at the present time. The piping 67 is connected to a return line 69 emptying into a receiving tank 71, which may be provided with a suitable float switch 72 for operating a pump 73 to return water to the boiler. Communicating with the upper portion of the tank 71 is a pipe 74 operatively connected at its upper end to a vacuum pump 75 adapted to be actuated by an electric motor 76. Connected to the return line 69 by suitable piping 77 is a diaphragm actuated switch designated generally by the numeral 78, comprising a housing 79 divided into an upper chamber 81 and a lower chamber 82 by a diaphragm 83, the pipe 77 communicating with the lower chamber 82, and the upper chamber 81 communicating with the atmosphere. Secured to the diaphragm 83 is a stem 84 which passes through the top of the housing 79 and is biased by a tension spring 85 connected at one end to the stem 84 and at the opposite end to an arm 86, the latter being pivotally supported at 87 by suitable structure (not shown), the opposite end of the arm 86 having a roller 88 resting upon a cam 89 rigidly connected to the drive shaft 58 of the motor 53. A stationary contact 91 and a movable contact 92 are connected in series with one side 93 of the power line running to the vacuum pump 76, the contacts 91 and 92 being adapted to be closed by a projection or lug 94, rigidly carried by the stem 84. Thus the stem 84 will be drawn upwardly by the spring 85 closing the contacts 91 and 92 to operate the motor 76 and vacuum pump 75. The pump 75 will continue to operate until the vacuum in the tank 71 and return line 69 is sufficient to draw the diaphragm 83 downward and open the contacts 91 and 92, thereby maintaining the vacuum at a relatively constant value. Obviously, by increasing or decreasing the tension exerted by the spring 85 upon the stem 84, the level at which the vacuum will be maintained may be varied.

The pressure reduction or metering valve 63 is provided with a partition 95 dividing the valve into an inlet chamber 96 and an outlet chamber 97, the partition 95 having a valve port 98 therein adapted to be closed by a valve member 99 carried by a stem 101, secured at its opposite end to a diaphragm 102, the latter forming a chamber 103 at the top of the valve communicating with the pipe 77 through a pipe 104 and thus with the return line 69. The diaphragm 102 is biased by a compression spring 105 tending to move the diaphragm downward and open the port 98 to let steam pass from the supply pipe conduit to the main 64. The upper end of the spring 105 is engageable with a stop 106 carried by a rod 107 extending up through the top of the valve 63 and terminating in a roller 108 engageable with the cam 109 rigidly carried by the drive shaft 58 of the motor 53, movement of the rod 107 being operative to increase or decrease compression of the spring 105.

Figure 5:
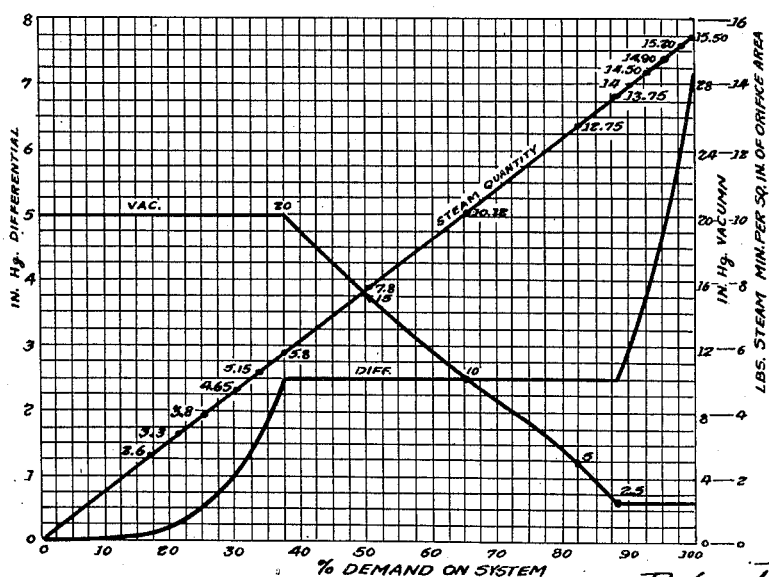
Fig. 5 is a graph illustrating the manner in which a sub-atmospheric steam heating system may be operated utilizing the control device herein described.

In operation the valve 63 will meter the steam into the supply main 64, the position of the valve member 99 depending upon the pressure differential between the supply main 64 and return piping and the position of the cam 109. It may be noted that the vacuum in the return line will oppose the force of the compression spring 105 and during operation of the system may at times exceed the force of the spring upon the diaphragm as where both return and supply are under sub-atmospheric pressure. Thus by varying the compression of the spring 63 and the tension of the spring 85, various conditions may be produced in the heating system. To achieve such results the cams 89 and 109 may be suitably shaped to produce whatever conditions are desired in the system throughout its range of operation so that by rotation of the cams 89 and 109 by the shaft 58 the output of the heating system will be varied as well as the operation conditions thereof, as desired. For example, the system may be operated as graphically illustrated in Fig. 5 which shows operating vacuum, steam pressure and differential between the supply main and the return line from zero percent demand, to one hundred percent demand, or the maximum capacity of the system.

Referring to the graph, it will be noted that up to approximately thirty-seven percent of the heating capacity of this system, a vacuum of twenty inches of mercury is maintained while the quantity of steam is increased from zero to approximately 5.8 pounds a minute per square inch of orifice area into the heat exchanger, thus producing a differential rising to two and one-half inches of mercury at thirty-five percent of total output. From thirty-seven percent to eighty-eight percent output the differential is maintained constant at 2.5 inches of mercury, the quantity of steam increasing during the same interval from 5.8 to approximately 13.75 pounds, and the vacuum across the system decreasing from twenty inches of mercury down to two and one-half inches of mercury. From eighty-eight percent output to the full capacity of the plant, the vacuum is maintained at a constant of two and one-half inches of mercury with a consequent rise in differential to approximately seven inches of mercury whereby the quantity of steam increases from 13.75 to 15.5 pounds a minute per square inch of orifice area.

It will be noted that with the above described system it is possible to obtain full control of the differential, selectively maintaining it constant or variable within predetermined limits. While systems have been designed in the past in which the differential is varied over the operating ranges, such systems merely operate at a gradually increasing differential as the steam output increases, this action being obtained from a device solely responsive to relative pressures within the system and by means of which either the steam input or the vacuum is controlled by changes in the other.

The complete electronic control circuit

As previously mentioned, the electronic control circuit illustrated in Fig. 1 discloses the circuit in a simplified form for the purpose of explaining the principles of operation thereof. As a matter of practical operation, it is desirable that various other elements be included in the circuit, and a circuit including such elements is illustrated in Fig. 3. For example, it is desirable that adjustment be provided whereby one type of control device may be utilized for various types of heat exchange systems, as well as with heating systems of different capacities. Similarly, as the heat loss in different enclosures will vary with the construction thereof, it is desirable that some adjustment be provided to compensate for such variations. Also in the case of heating systems, it is often desirable to provide for a day and night control whereby the system may be operated at a different temperature at night than during the day. The circuit illustrated in Fig. 3 provides these features, as well as others hereinafter described. In general, the same reference numerals are used in this figure as in Fig. 1 to identify like elements.

Referring to Fig. 3, it will be noted that the circuit illustrated therein contains the same control unit 1, vacuum tube 21, coupling transformer 26, the gas filled thyratron tube 34, solenoid 44, armature 48, etc. The unit 1 contains the temperature responsive resistor 2 and heating resistor 3, the resistor 2 being connected in closed series with a group of resistors to form a bridge network comprising the resistors 111, 112, 113, 114, 115, 116 and 117, the resistors 114 and 115 being connected in series and in parallel with the resistors 116 and 117 which are also connected in series. The resistors 114 and 117 are each provided with a movable contact which may be selectively connected to the grid of the vacuum tube 21 through a magnetic switch designated generally by the numeral 118, the circuit being either from the contact on the resistor 114 to the conductor 119 to the relay and conductor 121 to the grid of the tube when the winding of the switch 118 is deenergized, or from the contact on the resistor 117 through the conductor 122 to the relay and thence to the tube 21 by means of conductor 121 when the winding is energized. It will be noted that the movable contacts on the resistors 114 and 117 form terminals of one side of the bridge circuit so that the grid of the tube 21 may be selectively connected into the bridge circuit at either one of two points, which points are adjustable within the respective ranges of the resistors 114 and 117 respectively, their difference in range being provided by the resistors 115 and 116 so that the resistor 117 will cover a lower operating range than the resistor 114. By providing a suitable clock mechanism hereinafter described, the relay 118 may be actuated to shift the connection of the grid of the tube 21 from the resistor 114, constituting the day setting, to the resistor 117, constituting the night setting of the control. The network is bridged by an alternating potential from the transformer indicated generally by the numeral 123, the secondary winding 124 thereof being operatively connected to the juncture of the resistors 112 and 113 by the conductor 125, the opposite end of the winding being connected to the juncture of the resistor 2 and resistor 111 by the conductor 126, the conductor 126 being illustrated as running directly to the resistor 2 in the external unit 1.

A vacuum tube 21 is self-biased by the usual cathode resistor 23 and associated by-pass condenser 24, and the plate of the tube is connected to the primary 25 of the transformer 26 by a conductor 27. The opposite end of the primary 25 is connected to a high rectified voltage provided by a transformer 127, having the usual center tapped secondary 128, the alternating current being rectified by a rectifying tube 129 having its plates operatively connected to the ends of the secondary 128, and the center tap thereof being grounded through a resistor 131. The cathode of the rectifier 129 is connected to a primary 25 of the transformer 26 by a conductor 132, in series with which is the filter choke 133 by-passed by suitable condensers 134 to smooth out the rectified voltage from the rectifier 129. A bleeder resistor 135 is connected between the conductor 132 and ground to provide a stabilizing effect. Filament voltage for the rectifier 129 as well as tubes 21 and 34 is provided by an additional secondary winding 136. The grid of the thyratron tube 34 is connected to one end of the secondary 32 of the transformer 26 in series with a limiting resistor 137. The opposite end of the secondary 32 is connected to one side of the secondary winding 138 on the transformer 127 through the phase shifting condenser 43 by means of the conductor 139. The primary windings of both transformers 123 and 127 are connected to a power line by a pair of conductors 140.

A resistor 141 is connected at one end to the conductor 139 and at the opposite end to the opposite end of the secondary winding 138 of the transformer 127, the resistance capacity network formed by the condenser 43 and resistor 141, across the secondary 138, corresponding to the similar network across the secondary of the transformer 41 in the circuit illustrated in Fig. 1. As the flow of rectified current in the plate circuit of the vacuum tube 21 will create a voltage drop across resistor 131, this voltage drop may be utilized to provide a small initial bias on the grid of the tube 34, this biasing direct potential taking the place of the battery 38 illustrated in Fig. 1. This biasing direct potential is applied to the grid circuit of the tube 34 through the resistor 142 connected to the negative end of the resistor 131 and the resistor 141. Thus a small negative direct potential is applied to the grid in addition to the alternating potential developed across the resistor 141.

In some cases it may be desirable to shunt a small condenser 143 across the secondary 132 of the transformer 26 to tune the secondary to resonance with the alternating potential developed across the bridge network. Similarly, the secondary 32 may be shunted with a limiting resistor 144 for limiting the maximum voltage applied to the grid of the tube 34, particularly where such voltage may be opposite in phase as a result of a rise in temperature of the resistor 2 above the predetermined operating level. The resistor 144 is of a type that may be commercially procured and has the characteristic of decreasing in resistance upon the application of an increasing voltage across the same. Thus as the voltage increases across the secondary 32 beyond a predetermined amount, such undesirable high voltage is prevented from reaching the grid of tube 34 due to the lowered resistance of the resistor 144.

Conductor 145 connects the plate of the tube 34 to one contact of a relay tube designated generally by the numeral 146, the coacting contact of the relay 146 being connected by conductor 147 to one side of the secondary 148 of the transformer 123, the conductor 147 being connected to the secondary 148 through a suitable variable resistor 149. The filament of the relay tube 146 is connected to the secondary 136 of the transformer 127 with the filaments of the other tubes, and the purpose of the tube 146 is to prevent the application of a potential upon the plate of the tube 34, when initially starting the device into operation, until the filament of the tube 34 has warmed up, thus preventing possible damage to the tube as well as irregular action thereof. The opposite end of the secondary 148 is connected by a conductor 151 to a suitable millimeter 152 and then by a conductor 153 to the solenoid winding 44, the opposite end of the solenoid winding 44 being grounded through resistors 154 and 155. The latter resistor is provided with an adjustable contact which is connected in series with a resistor 156 to the resistor 3 of the control unit 1 by a conductor 157, the opposite end of the resistor 3 being grounded through a conductor 159. The purpose of the variable contact on the resistor 155 is to vary the amount of current passing through the resistor 3 to compensate for differences in heat loss between the unit 1 and the enclosure. The purpose of the resistor 149 is to provide an adjustment of the maximum voltage applied to the tube 34.

*Automatic day and night control*

If desired, a control may be incorporated in the device for automatically providing separate day and night control of the system, as for example, where it is desired to maintain a lower temperature in the building during the night than that maintained during the day. Provision is made in the circuit illustrated in Fig. 3 for achieving these results, the numeral 161 illustrating generally such a control unit, the motivating element of the unit being an electric clock 162 operable to actuate a pair of single pole double throw switches indicated generally by the numerals 163 and 164 respectively, suitable mechanism being provided whereby the clock will actuate the switches 163 and 164 to the right, or day position at a preselected time, and to the left, or night position at a second preselected time. Also contained within the unit is a magnetically operated switch indicated generally by the numeral 165 of a single pole, double throw type, adapted to be actuated from one position to another by a pair of solenoid windings 166 and 167. The solenoid 166 is operatively connected to the power line 168, which operates the clock mechanism 162, through the switch 163 when the latter is in the left or night position. The solenoid winding 167 likewise is operatively connected to the power line 168 through a thermostatic switch 169 and the switch 163 when the latter is in its right or day position. The switch 165 is so constructed that it will be mechanically maintained in one position until it is drawn into the other position by actuation of the correct solenoid, in which position it will remain until returned by actuation of the other solenoid. The control unit 161 operates the relay 113 at preselected times to switch the connection of the grid of the vacuum tube 21 from the resistance 114 to the resistance 117 and back again, thereby changing the balance of the bridge network and the operation of the heating system, whereby the latter will be operated at a reduced output at night. As the clock movement 162, thermostat 169, solenoid windings 113, 166 and 167, and the motor 53, as illustrated in Fig. 3, are designed for 24 volt operation, the power line 168 is connected to the secondary of a stepdown transformer 170 connected to the main power line.

*The switching mechanism*

To provide flexibility in the operation of the heating system a suitable switching mechanism is employed. This switching mechanism includes a 4-pole, 6-position switch, the positions of which are as follows: off, manual, automatic, full on, day and night. In the "off" position the control is rendered inoperative. In the "manual" position it may be manually adjusted to operate the heating system from zero percent to one hundred percent capacity. In the "automatic" position the operation of the system is completely automatic, including automatic day and night control. In the "on" position the system is set to operate at full capacity. In the "day" position the daytime temperature setting will be maintained constantly, and in the "night" position the night time temperature setting will be maintained constantly.

Referring to Fig. 3, 171a, 171b, 171c and 171d indicate the respective sections of a 4-pole switch designated generally by the numeral 171, the sections of which are adapted to be manually operated simultaneously by a single knob. Each of the sections of the switch 171 comprises a movable contact 172 engageable with any one of six contacts. The movable contacts 172 of the four sections of the switch 171 are similarly positioned relative one another at all times so that when the contact arm 172 of the section 171a is engageable, as illustrated, with the first contact designated "off," the other three contact arms 172 will be in a similar position. For convenience, the contacts of the various sections of the switch will be designated as "off," "manual," "automatic," "on," "day" and "night" contacts and will occupy the same relative position as the contacts so designated on the drawing with respect to the section 171a of the switch. The movable contact 172 of the section 171a of the switch is connected to the center controlling terminal of the modulating motor 53 by a conductor 173. The "off" contact of this section is connected by conductors 174 and 175 to the "night" stationary contact of the switch 164, indicated by the letter N, and to the contact of the switch 165 by the conductor 176. The movable contact of the switch 165 is connected by a conductor 177 to the stationary "day" contact indicated by the letter D of the switch 164, the movable contact of the latter being connected by a conductor 178 to the center or common terminal of the modulating motor 53. The motor 53 has three control terminals designated for convenience as left, center or right terminals and indicated on Fig. 3 of the drawings as L, C and R respectively. The stationary "night" contact of the switch 163 is operatively connected to the right control terminal R of the modulating motor 53 by conductors 179 and 181 and to the movable contact 172 of the section 171b of the control switch by a conductor 182. No connection is made to the stationary "off" contact of the section 171b. The stationary "off" contact of the section 171a is also connected to the movable contact 51 engageable with the resistance 52, magnetically actuated by the electronic circuit, by the conductor 174 and the conductor 183. A conductor 184 also connects the movable contact 51 with the movable contact 185 of the "on" contact of the section 171b.

The movable contact 185 is engageable with a resistance 186, the ends of which are connected to the "manual" contacts of sections 171a and 171b by conductors 187 and 188 respectively. The automatic contacts of these sections are connected to the ends of the resistance 52 by conductors 189 and 191 respectively. The "day" and "night" contacts of both sections 171a and 171b are connected to their respective "automatic" contacts by conductors 192 and 193.

The characteristics of the modulating motor 53 are such that when the control terminal C is connected to the control terminal L the drive shaft thereof will be rotated into one of its extreme positions, the cams 89 and 109 being so shaped that the heating system will be inoperative when the cams are in that position. Similarly when the control terminal C of the motor is operatively connected to the control terminal R the drive shaft will be rotated until it is in its other extreme position, the cams being so designed that the heating system will be then operating at full capacity. The drive shaft may be positioned intermediate these two extreme positions by varying the relative resistance between the control terminal C and the right and left control terminals R and L, this being accomplished in the present construction by either of the resistors 52 or 186 and their respective movable contacts.

When the control switch 171 is in the "off" position, the control terminal C and the control terminal L of the motor 53 are operatively connected to shut down the heating system, the circuit being traced as follows: from the terminal L of the motor through the conductor 173, movable contact 172 of section 171a of the control switch, the off contact of that section, through conductors 174 and 175 to the day-night control unit. Assuming this unit is in the day time position, through conductor 176, switch 165, conductor 177, through switch 164 and conductor 178 to control terminal C of the modulating motor. Assuming that the switches 163, 164 and 165 are in the night position, the circuit is completed from the conductor 175 to the "night" contact on the switch 164, through the conductor 178 to control terminal C.

When the control switch 171 is in the manual position, the resistance 186 is bridged across the control terminals R and L of the motor 53 by conductors 187, 173, 188, 182 and 181 respectively. The movable contact 185 is operatively connected to the terminal C of the motor through the same circuit previously described with respect to the "off" contact, as the movable contact 185 is operatively connected by means of the conductors 184, 183 and 174 to the "off" contact. In this position of the control switch 171, the output of the system may be varied by manual movement of the movable contact 185 with respect to the resistance 186, the drive shaft of the modulating motor following the relative position of such movable contact relative to its position with respect to the resistance 186.

When the control switch 171 is in the "automatic" position, the resistance 52 is shunted across the control terminals R and C of the modulating motor in place of the resistance 186, the two resistors having the same total resistance. The movable contact 51, engageable with the resistance 52, will be operatively connected to the terminal C by conductor 83 and the same circuit previously described for the movable contact 185 and the "off" contact of the section 171a, as all three of these elements are electrically connected to one another. Thus the heating system will be under the direct control of the electronic circuit as the latter causes movement of the movable contact 51 across the resistance 52.

When the control switch 171 is in the "on" position the terminal R of the modulating motor will be connected to the terminal C through the conductors 81 and 82, across the switch 171, through the conductor 184 and through the same circuit as has been previously described through the day-night unit to the terminal C. Thus the drive shaft of the modulating motor 53 will be rotated to its extreme position for actuating the heating system at full capacity.

As the "day" and "night" contacts of both sections 171a and 171b are connected to the "automatic" contacts of the respective sections, operation insofar as these two sections of the switch are concerned, will be the same as that previously described when the control switch 171 is in the "automatic" position.

Section 171c of the control switch is operable to switch either the day circuit or the night circuit into operation. The movable contact 172 of this section is connected by a conductor 194 to one side of the winding of the solenoid switch 113, the opposite end of this winding being connected by a conductor 195 to the power line. The relay switch 118 is so constructed that it will normally be in the position illustrated in Fig. 3 in the absence of passage of current through the winding, thus connecting the movable contact on the resistance 114 with the grid of the vacuum tube 21, this position being the day time setting of the network.

The "automatic" contact of the section 171c of the control switch is connected by a conductor 196 with the stationary "night" contact of the switch 163 and as the movable contact of such switch is connected to the opposite side of the power line, when the clock mechanism 162 engages the movable contact of the switch 153 with the stationary night contact thereof, current will flow through the winding of the switch 118, drawing the armature thereof over and connecting the grid of the vacuum tube 21 with the movable contact on the resistance 117 which provides the night setting of the control. The only other connection to this section of the switch is the conductor 197 which connects the night contact of that section to the opposite side of the power line to which the conductor 195 is connected.

When the control switch 171 is in the "day" position, the entire control will operate in substantially the same manner as when on automatic, with the exception that the circuit through magnetic switch 118 is open, whereby the system will be continuously operated at the day time setting.

When the control switch is set in the "night" position, the system is again operating in substantially the same manner as when on automatic, with the exception that the magnetic switch 118 is continuously being actuated, thereby continuously maintaining the grid of the vacuum 21 on the night time setting, current flowing through the conductor 197, section 171c of the switch, then up through the winding of the magnetic switch 118 as previously described for the automatic setting.

If visual indication of the operation of the system is desired, indicator lamps 198, 199 and 200 may be provided. The lamp 198 is merely connetced across the conductors 194 and 195 and will then be illuminated whenever the system is operating on the night setting, either as a result of the operation of the clock mechanism 162, when the control switch is in the automatic position, or when the control switch is in the night position. The lamp 199 is connected to the "automatic," "day" and "night" contacts of section 171d of the control switch and the lamp 200 to the manual and full on contacts of such section, the movable contact 172 thereof being connected to the conductor 197, thereby completing the circuit. Thus when the control switch 171 is on the "manual" or "on" position, the bulb 200 will be illuminated, indicating that the system is being manually controlled, and when the control switch is in the "automatic" or "day" or "night" positions, the bulb 199 will be illuminated, indicating that the system is then being operated under the control of the electronic circuit.

One side of the thermostatic switch 169 is connected by a conductor 201 to one end of the solenoid winding 167 and the other side of the switch 169 is connected to the "day" stationary contact of the switch 163 by a conductor 202. The other end of the solenoid winding 167 is connected by a conductor 203 to one side of the power line so that when the switch 163 is in the "day" position and the thermostatic switch 169 closed, the winding 167 of the magnetic switch 165 will be actuated. The stationary "night" contact of the switch 163 is connected by a conductor 204 to one end of the solenoid winding 166, the opposite end of the latter being connected to the conductor 203, as illustrated. Thus when switch 163 is in the "night" position, the winding 166 will be energized to move the switch 165 to its "night" position. When the switch 163 moves to the "day" position, the winding 167 will not be energized until the thermostatic switch 169 is closed. This switch is a normally open switch operated to close when the surrounding temperature rises above a preselected point.

*Operation of the complete electronic control*

Assuming the control switch 171 is in the "automatic" position and the system is operating on the day time setting of the day-night unit 161, the device will be controlled by variations in the temperature of the resistor 2, the grid of the vacuum tube 21 being connected to the movable contact of the resistor 114, and the modulating motor 53 will be controlled by the position of the movable contact 51 across the resistance 52. When the clock mechanism reaches the night setting, the grid of the vacuum tube 21 will be disconnected from the resistance 114 and connected to the movable contact of the resistance 117 to provide a reduction in the output of the system, the control circuit otherwise functioning as during the day. This action will continue until the clock mechanism 162 again reaches the day setting, at which time the grid of the tube 21 is reconnected to the resistor 114 and the thermostatic switch 169 connected into the circuit, this switch being set for the desired day time temperature to be maintained in the building. The system will then operate at full capacity, independent of the action of the outside resistor 2, to bring the temperature in the enclosure up to the day time temperature desired, at which point the switch 169 will close, thereby transferring control of the system back to the outside resistor 2 for day time operation.

A detailed description of these functions is as follows:

Again assuming the control switch in "automatic" position and the system operating at the day time setting, the winding of the switch 118 will be deenergized as switch 163 is in its day position, whereby the grid of the vacuum tube 21 will be connected with the resistance 114. As the temperature of the resistance 2 drops, current will flow in the plate circuit of the thyratron tube, as previously described in connection with the basic circuit illustrated in Fig. 1, thus energizing the solenoid winding 44 and moving the contact 51 across the resistance 52, thereby actuating the modulating motor 53, the control circuit in such case being as follows: from the control terminal R of the modulating motor through section 171b of the control switch to the resistance 52, thence through the section 171a of the control switch to the control terminal L of the modulating motor. The control terminal C is connected to the movable contact 51 through conductors 178, switch 164, which is in its "day" position, conductor 177, switch 165, also in its "day" position, conductor 176, conductors 175 and 183. The solenoid winding 167 is energized through the following circuit: from the power line to one side of the winding through conductor 203, from the other side of the winding through conductor 201, through the switch 169, conductor 202 through the switch 163, which is in its "day" position, to the opposite side of the power line.

When the clock mechanism reaches its night setting, switches 163 and 164 will be moved to their "night" position. The solenoid winding 166 is thereupon energized through the conductor 204, moving the switch 165 into its night position, switch 163 simultaneously breaking the circuit to the thermostatic switch 169 and deenergizing the solenoid winding 167. When the switch 165 moves into its night position, current flows from one side of the power line through the switch 163, conductor 196, section 171c of the control switch, conductor 194 through the winding of the magnetic switch 118 and conductor 195 to the opposite side of the power line, thus energizing the switch 118 and shifting it from its "day" to its "night" position, whereby the grid of the vacuum tube 21 will be operatively connected to the resistance 117.

As the thermostatic switch 169 is set for the day time temperature in the enclosure, when the temperature drops, due to the low night time setting, this switch will open; consequently, when the clock mechanism again reaches the day setting and switches 163 and 164 return to their day position, the winding 167 of the switch 165 will not be immediately energized as the switch 169 with which it is in series is open. Switch 165, therefore, remains in its night position. However, when switch 163 is returned to its day position, it opens the circuit through the winding of switch 118, consequently the grid of the tube 21 is reconnected to the resistance 114. At this point the system is operating at full capacity as the control terminal C of the modulating motor 53 is connected to the control terminal R of the motor through conductor 178, switch 164, conductor 177, switch 165 (still in its night position), and conductor 179. As a result of the system being operated at full capacity, the temperature of the enclosure interior will be rapidly brought up to the desired day time operating temperature, and as soon as the latter is reached the thermostatic switch 169 will close, thereby energizing the winding 167 of the switch 165 and moving the same to its day time position, in which position the shunt between the control terminals C and R is broken; consequently the operation of the system drops from full capacity to that demanded by the position of the movable contact 51, as the circuit is now in the original starting position.

By moving the control switch 171 to the "manual" position, the resistance 186 and movable contact 185 are substituted for the resistance 52 and the contact 51 respectively, and as the contact arm 185 is adapted to be manually moved, such movement will readily control the system, as desired. It will be noted that when so operated the day-night control is rendered inoperative.

In the event the day-night control feature is not desired, the control unit 161 and associated elements may be eliminated and the conductor 175 connected directly to control terminal C of the motor 53, as indicated by the dotted line 205.

*Installation*

In installing a heating system embodying the present invention, the control unit 1 is mounted on the exterior of the building in a suitable location where the action of the elements thereon will be representative of the action of such elements on the building and the unit connected to the electronic control by means of suitable conductors. After the system has been placed in operation, it may be necessary that the movable contact on the resistor 155 be adjusted so as to balance the amount of current going through the heating resistance 3 with the output of the heating system so that the heat lost by the resistor 3, as a result of the external weather conditions acting thereupon, will be substantially proportional to the amount of heat lost from the enclosure. This adjustment will also depend to a large extent upon the heating capacity of the system employed as a system relatively large in proportion to the heating demands made upon it will necessitate the operation of the system at a lower percentage of its maximum output than that required from a relatively smaller heating system which must then be operated at a higher percentage of its capacity to produce the amount of heat necessary to compensate for heat lost from the enclosure.

The manual controls for moving the movable contacts on the resistors 114, 117 and 186 may be suitably graduated for ease of adjustment and all manual controls, switches, milliammeters, indicating lamps, etc., may be mounted on a suitable control panel, the milliammeters being graduated in percent of the maximum output of the system.

It will be obvious from the above description that I have provided a novel method of controlling heat exchange systems or the like wherein the operation of the system is continuously varied in proportion to existing and variable losses within the system; likewise that I have provided novel means for performing such methods, and while such means have been illustrated in connection with a steam heating system, it will be obvious to those skilled in the art that my control device may be readily adapted for use on heat exchange systems other than heating systems. Likewise my invention may be utilized on heating systems other than steam heating systems, as for example, hot water, hot air and the like. With respect to the latter applications of my invention, it would merely be necessary to provide suitable means on the drive shaft 58 of the modulating motor 53 to vary the variable elements in such systems, for example, in the case of a hot water system, the modulating motor 53 may be utilized to vary the rate of flow of the water in the system or the temperature of the water or both.

Similarly in the case of a hot air system, the modulating motor could be readily adapted to control the temperature of the circulated air or the volume thereof or both.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In an electronic control device, the combination of an electronic discharge valve having cathode, anode and control grid elements, an electrical resistance bridge circuit operatively connected to the grid of said valve, a temperature responsive variable resistance element in said bridge circuit, means for applying alternating potentials to said bridge circuit and the anode of said valve, means for applying a biasing potential, differing in phase relative to said first potentials, to the grid of said valve, variations in the resistance of said variable resistance element being operable to apply a portion of the potential applied to said bridge circuit to the control grid of said valve to cause the latter to conduct over variable portions of a positive half cycle of such potential, heating means actuated by the anode current of said valve in heat transfer relationship with said variable resistance element to maintain the same at a substantially constant temperature, and control means connected to said anode and actuated by said anode current.

2. In an electronic control device, the combination of an electronic discharge valve having cathode, anode and control grid elements, an electrical resistance bridge circuit operatively connected to the grid of said valve by an electronic amplifying circuit, said bridge circuit including a temperature responsive variable resistance element therein, means for applying alternating potentials to said bridge circuit and the anode of said valve, means for applying a biasing alternating potential, differing in phase relative to said first mentioned potentials, to the grid of said valve, variations in the resistance of said variable element being operable to apply a portion of the potential applied to said bridge circuit to said amplifying circuit, the amplified potential therefrom being applied to the control grid of said valve to cause the latter to conduct during variable portions of a positive half cycle of such potential, a heating resistance in heat transfer relation to said variable resistance element said heating resistance being connected to said anode and being energized by the anode current, and control means connected to said anode and actuated by said anode current.

3. In an electronic control device, the combination of a plurality of resistances connected in closed series to form an electrical bridge, one of said resistances being variable in response to temperature changes, means for applying an alternating potential across said bridge, an electronic amplifying circuit operatively connected across opposite sides of said bridge for amplifying alternating potentials appearing thereacross resulting from variations in said variable resistance, means for manually varying the characteristics of said bridge, an electronic discharge valve having cathode, anode and grid elements, means for applying an alternating potential to the anode of said valve, means operatively connecting the output of said amplifying circuit to said grid element, means for applying a negative biasing direct potential to said grid, means for applying a biasing alternating potential, differing in phase from said first mentioned alternating potentials to the grid of said valve, said biasing potentials being operative to render said valve substantially nonconductive in the absence of an output potential in said amplifying circuit, a heating resistance in heat transfer relation to said variable resistance, means for passing anode current from said valve through said heating resistance, and transducing means connected to said anode and actuated by said anode current for converting said anode current into mechanical movement.

4. In an electronic control device, the combination of an electrical resistance bridge circuit having a variable temperature responsive resistance element therein, a source of potential applied to said bridge circuit, electronic means responsive to changes in potential across said bridge circuit resulting from variations in the resistance of said element, a heating resistance energized by said electronic means in heat transfer relationship with said variable temperature responsive resistance element, to maintain said temperature responsive resistance at a substantially constant temperature, and control means actuated by said electronic means.

5. In an electronic control device, the combination of an electronic discharge valve having cathode, anode and control grid elements, an electrical bridge circuit operatively connected to the grid of said valve, said circuit including a temperature responsive resistance element therein, means for applying alternating potentials to said bridge circuit and the anode of said valve, means for applying a biasing alternating potential, differing in phase relative to said first potentials, to the grid of said valve, variations in the temperature responsive resistance element of said bridge circuit being operable to apply a portion of the potential applied to said circuit to the control grid of said valve to vary the conducting period of said valve, means connected to the anode and actuated by the anode current of said valve for supplying heat to said temperature responsive resistance element, and means adapted to control a condition, said last mentioned means being connected to said anode and being actuated by said anode current.

6. In an electronic control and measuring device, the combination of an electrical resistance bridge circuit having a variable temperature responsive element therein, a source of potential applied to the bridge circuit, electronic means proportionately responsive to changes in the unbalance potential of the bridge circuit resulting from variations in the resistance of said element, means energized by the electronic means for proportionately heating said element to maintain the bridge in substantial balance, control means energized by the electronic means and adapted to control heating apparatus and time controlled means for changing resistance in the bridge circuit other than the variable element to make it balance at a different temperature.

7. In a control device the combination of an electrical resistance bridge circuit having a variable temperature responsive resistance element therein, a source of potential applied to the bridge circuit, electronic means proportionately responsive to changes in the unbalance potential of the bridge circuit resulting from variations in the resistance of said element, means energized by the electronic means for heating said element, a modulating motor adapted to control heating apparatus for an enclosure, a first control means for the motor responsive to heat input to said element, a second control means for the motor, and time controlled means for switching the control of the motor to either of said first and second control means.

8. Control apparatus for a heating system of a first enclosure comprising an electronic discharge valve having cathode, anode and control grid elements, an electrical resistance bridge operatively connected to the grid of said valve, said circuit including a temperature responsive variable resistance element therein, means for applying alternating potentials to said bridge circuit and the anode of said valve, means for applying a biasing potential, differing in phase relative to said first potentials, to the grid of said valve, variations in the resistance of said variable resistance element being operable to apply a portion of the potential applied to said bridge circuit to the control grid of said valve to cause the latter to conduct variable portions of a cycle, a second enclosure in which said temperature responsive resistance element is mounted, heat insulating means between said first and said second enclosure heating means in said second enclosure energized by the anode current of said valve for maintaining the temperature of said temperature responsive resistance element substantially constant, control means responsive to said anode current and adapted to control said first enclosure heating system.

9. In an electronic control device, the combination of a plurality of resistances connected in closed series to form an electrical bridge, one of said resistances being variable in response to temperature changes, means for applying an alternating potential across said bridge, an electronic amplifying circuit operatively connected across opposite sides of said bridge for amplifying alternating potentials appearing thereacross resulting from variations in said variable resistance, an electronic discharge valve having cathode, anode and grid elements, means for applying an alternating potential to the anode of said valve, means operatively connecting the output of said amplifying circuit to said grid element, means for applying a negative biasing direct potential to said grid, means for applying a biasing alternating potential, differing in phase from said first mentioned alternating potentials to the grid of said valve, said biasing potentials being operative to render said valve substantially nonconductive in the absence of an output potential in said amplifying circuit, a heating resistance in heat transfer relation to said variable resistance, means connecting said heating resistance to the anode of said valve, adjustable means for passing a variable portion of said anode current through said heating resistance and transducing means connected to said anode and actuated by said anode current for converting said anode current into mechanical movement.

10. In an electronic control device for a heating system of an enclosure, the combination of an electronic tube having a cathode, an anode and a control grid, an electrical bridge circuit operatively connected to the grid of said tube, said bridge circuit including a temperature responsive resistance element, heat insulating means between said temperature responsive resistance element and said enclosure, means for applying electrical potentials to said bridge circuit and to the anode of said tube, variations in the temperature responsive element being operable to apply a portion of said potential supplied to said bridge circuit to the control grid of said tube to vary the anode current of said tube, means connected to the anode and actuated by the anode current for supplying heat to said temperature responsive resistance element to maintain the temperature of said temperature responsive resistance element substantially constant, and means adapted to control heating apparatus for said enclosure, said last mentioned means being connected to said anode and being actuated by said anode current.

ROBERT G. MINER.

REFERENCES CITED

The following references are of record in the file of this patent:

UNITED STATES PATENTS

| Number | Name | Date |
| --- | --- | --- |
| 1,720,723 | Dodge | July 16, 1929 |
| 1,867,139 | Bellescize | July 12, 1932 |
| 1,960,217 | Unger | May 22, 1934 |
| 1,989,829 | Specht | Feb. 5, 1935 |
| 2,059,362 | Kimball | Nov. 3, 1936 |
| 2,073,326 | Taylor | Mar. 9, 1937 |
| 2,086,966 | Shrader | July 13, 1937 |
| 2,134,257 | Leutwiler | Oct. 25, 1938 |
| 2,136,559 | Miller | Nov. 15, 1938 |
| 2,160,600 | Midyette | May 30, 1939 |
| 2,162,952 | Jennings | June 20, 1939 |
| 2,164,701 | Cohen | July 4, 1939 |
| 2,192,144 | Miller | Feb. 27, 1940 |
| 2,234,030 | Walker | Mar. 4, 1941 |
| 2,273,260 | Guler | Feb. 17, 1942 |
| 2,273,978 | Montgomery | Feb. 24, 1942 |
| 2,290,091 | Brown et al. | July 14, 1942 |
| 2,292,975 | Spangenberg | Aug. 11, 1942 |
| 2,315,984 | Satchwell | Apr. 6, 1943 |
| 2,334,216 | Newton | Nov. 16, 1943 |
| 2,384,373 | Harris | Sept. 4, 1945 |
| 2,402,210 | Ryder et al. | June 18, 1946 |

FOREIGN PATENTS

| Number | Country | Date |
| --- | --- | --- |
| 283,596 | Great Britain | May 17, 1928 |